United States Patent Office 2,995,596
Patented Aug. 8, 1961

2,995,596
PRODUCTION OF PHOSPHORIC ACID-DIALKYLESTER-AMINES
Arno Debo, Heidelberg, Germany, assignor to Joh. A. Benckiser G.m.b.H., Chemische Fabrik, Ludwigshafen (Rhine), Germany
No Drawing. Filed Aug. 30, 1957, Ser. No. 681,187
Claims priority, application Germany Sept. 1, 1956
6 Claims. (Cl. 260—461)

The present invention relates to the production of phosphoric acid-dialkylester-amides, and more particularly to a new method for the production of phosphoric acid-dialkylester-amides which method is generally applicable to the production of a large group of compounds including a new group of compounds which were not produced prior to the present invention.

Most particularly, the present invention relates to the production of phosphoric acid-dialkylester-amides having the following general formula:

(I) $(R^1O)(R^2O)P(Y)NR^3R^4$ wherein $R^1$ and $R^2$ are alkyl groups, $R^3$ is an alkyl, oxyalkyl, cycloalkyl, carboxyalkyl or acyl group, $R^4$ is an alkyl, oxyalkyl, cycloalkyl, carboxyalkyl, aryl, acyl group or the hydrogen atom, or wherein $NR^3R^4$ can have the definitions as above given or it can also be a cyclic secondary amine radical, and wherein Y is either oxygen or sulfur.

Prior to the present invention the production of compounds of the above type had to be carried out under the exclusion of water. In addition, the processes were relatively complicated with respect to the details of the process and the yields obtained were rather low. In addition, only a relatively limited number of compounds of the above general formula could be produced.

It is therefore a primary object of the present invention to provide a new and simple method of producing phosphoric acid-dialkylester-amides of the above type.

It is another object of the present invention to provide a method of producing phosphoric acid-dialkylester-amides of the above type which method can be utilized for the production of all compounds falling within the above general formula including an entirely new group of compounds which have never been produced prior to the present invention.

It is still another object of the present invention to provide a new method of producing phosphoric acid-dialkylester-amides in much more simple manner and with much higher yield than could be obtained prior to the present invention.

It is still a further object of the present invention to provide a method of producing the above phosphoric acid-dialkylester-amides in aqueous medium, which method is simple and gives a high yield.

As another object the present invention provides a new group of compounds which could not be produced prior to the present invention.

With the above objects in view, the present invention mainly consists in a method of producing phosphoric acid-dialkylester-amides of the following general formula:

(I) $(R^1O)(R^2O)P(Y)NR^3R^4$ wherein $R^1$ and $R^2$ are the same or different alkyl groups, wherein $R^3$ is selected from the group consisting of alkyl, oxyalkyl, cycloalkyl, carboxyalkyl and acyl, wherein $R^4$ is selected from the group consisting of alkyl, oxyalkyl, cycloalkyl, carboxyalkyl, aryl, acyl groups and the hydrogen atom, wherein $NR^3R^4$ may be a cyclic secondary amine radical, and wherein Y is selected from the group consisting of oxygen and sulfur, comprising the steps of reacting a halogenphosphoric acid-dialkyl ester of the following general formula:

(II) $(R^1O)(R^2O)P(Y)X$ wherein $R^1$, $R^2$ and Y have the above set forth definitions and wherein X is a halogen atom, most particularly the chlorine atom though it may also be another halogen such as bromine, with a secondary amine having the following formula:

(III) $HNR^3R^4$ wherein $R^3$, $R^4$ and $NR^3R^4$ have the same definitions as set forth above, in the presence of an aqueous solution of an inorganic base such as sodium carbonate. It has been found that the alkylester-amides of phosphoric and thiophosphoric acid can surprisingly enough be produced in simple manner and in practically quantitative yield (calculated on the amount of amine utilized) by mixing a primary or secondary amine with an inorganic aqueous base, most preferably sodium carbonate solution, and adding this mixture dropwise under stirring, and if necessary cooling, to the desired halogen phosphoric acid dialkylester. In accordance with the method of the present invention the hydrogen halide, e.g. hydrogen chloride which is freed during the reaction is bound by the aqueous inorganic base and accordingly the use of an excess of the amine or an excess of the organic base is unnecessary.

The method of the present invention can be carried out utilizing any halogen phosphoric acid falling within the general Formula II above. The following is a list of some suitable chloro-phosphoric or thiophosphoric acid-dialkyl esters which may be utilized in accordance with the present invention:

$ClP(O)(OCH_3)_2$
$ClP(O)(OC_2H_5)_2$
$ClP(O)(OC_3H_7)_2$
$ClP(O)(O\ iso—C_3H_7)_2$
$ClP(O)(OC_4H_9)_2$
$ClP(O)(O\ iso—C_4H_9)_2$
$ClP(O)(O\ iso—C_5H_{11})_2$
$ClP(S)(OCH_3)_2$
$ClP(S)(OC_2H_5)_2$
$ClP(S)(OC_3H_7)_2$
$ClP(S)(O\ iso—C_3H_7)_2$
$ClP(S)(OC_4H_9)_2$
$ClP(S)(O\ iso—C_4H_9)_2$
$ClP(S)(O\ iso—C_5H_{11})_2$ Naturally the corresponding bromine esters of the above compounds can be used in place of the chlorine esters. Likewise mixed esters can be used, as for example the following:

$ClP(O)(OCH_3)OC_2H_5$
$ClP(O)(OC_3H_7)OC_4H_9$
$ClP(S)(OCH_3)OC_2H_5$
$ClP(S)(OC_3H_7)OC_4H_9$

All primary and secondary amines falling under the Formula III above may be utilized in accordance with the present invention. Thus, for example monoalkyl-amines and dialkyl-amines wherein the alkyl group may have any number of carbon atoms from 1 to 18 may be utilized. In addition, oxyalkyl-amines such as $H_2NCH_2CH_2OH$, $HN(CH_2CH_2OH)_2$ cycloalkyl-amines such as $H_2NC_6H_{11}$, $HN(C_6H_{11})_2$ imino-di-acetic acid derivatives such as $HN(CH_2COOCH_3)_2$, $HN(CH_2COOC_2H_5)_2$ acid amides such as $$H_2NCOCH_3, HN(COCH_3)_2$$

aryl amines such as aniline, toluidine, xylidine, and dialkyl-amino-alkyl-amines such as $$H_2NCH_2CH_2CH_2N(CH_3)_2$$

As inorganic bases it is of course most preferred to utilize the cheapest available inorganic bases such as sodium carbonate, sodium hydroxide and ammonium hydroxide. Of course, other inorganic bases such as calcium hydroxide, potassium hydroxide, potassium carbonate and the like may also be utilized. However since the reaction proceeds perfectly with the cheapest inorganic bases it is of course desirable to utilize such inorganic bases. The concentration of the inorganic base in the aqueous solution is preferably between 5–30% by weight, and most preferably about 20% by weight.

The formation of the phosphoric acid or thiophosphoric acid dialkylester-amides of the present invention is only possible because the connection between the P of the halogen phosphoric acid dialkylester and the N of the amine proceeds faster than the hydrolysis of the halogen phosphoric acid-dialkylesters. Although this fact is rather surprising it provides in the method of the present invention for the possibility of obtaining practically quantitative use of the amines which makes the method of the present invention extremely suitable particularly when expensive and relatively rare amines are to be converted to the phosphoric or thiophosphoric acid-dialkylester-amides.

The isolation of the compounds produced in accordance with the method of the present invention provide no difficulties whatsoever. If the end product is solid, then filtration or centrifugation from the aqueous solution is sufficient. If the final product is liquid and insoluble in water, then the compound may be separated in a separatory funnel. If the final product is soluble in water, then the solution is evaporated to dryness and the residue is extracted with a suitable solvent. Obviously in the case of a final product which is soluble in water it is also possible to directly extract the same by means of a suitable solvent.

In addition to the novel method set forth above, the present invention also provides for the first time for the production of a new group of compounds. These compounds, which are set forth in the following table, have been found to have excellent properties as additives for lubricating oils and hydraulic high pressure oils.

the present invention, the scope of the invention not however being limited to the specific details of the examples.

EXAMPLE 1

*Production of phosphoric acid diethylester-dicyclohexylamide*

$$(C_2H_5O)_2P(O)N(C_6H_{11})_2$$

A glass beaker is placed in ice water and filled with 130 cc. of 20% sodium carbonate solution as well as 36.2 g. of dicyclohexylamine. Under strong stirring there is added dropwise 34.5 g. of monochlorophosphoric acid-diethylester. After completion of the dropwise addition the reaction mixture is evaporated under vacuum and extracted with absolute ethyl alcohol. The compound recovered is phosphoric acid diethylester-dicyclohexylamide. After evaporation of the ethanol a total of 63 g. which is equivalent to a 99% yield of the phosphoric acid diethylester-dicyclohexylamide is recovered. This compound after recrystallization from cyclohexane has a melting point of 140° C.

EXAMPLE 2

*Production of phosphoric acid diethylester-dibutylamide*

$$(C_2H_5O)_2P(O)N(C_4H_9)_2$$

A glass beaker is placed in ice water and filled with 130 cc. of 20% aqueous sodium carbonate and 25.8 g. of dibutylamine. There is then added dropwise under stirring 34.5 g. of monochlorophosphoric acid-diethylester. After completion of the dropwise addition the precipitated salt is filtered off and the solution is introduced into a separatory funnel. The oily layer is separated. The yield of phosphoric acid diethylester-dibutylamide is 49.5 g. which is equal to a 93% yield. The boiling point equals 115° C.

EXAMPLE 3

*Production of phosphoric acid-diethylester-ethylamide*

$$(C_2H_5O)_2P(O)HNC_2H_5$$

A glass beaker is placed in ice water and filled with 130 cc. of 20% aqueous sodium carbonate solution and 9 g. of ethylamine. There is then added dropwise under stirring 34.5 g. of monochlorophosphoric acid-diethylester. After the completion of the addition the reaction mixture is made weakly alkaline by the addition of hydrochloric acid and the water is evaporated under vacuum. The reaction product is separated from the residue by suction. The residue is washed with absolute ethanol. After

| Formula | M.P. or B.P. | $n_D^{20}$ | Produced according to example | Yield in percent |
|---|---|---|---|---|
| $(C_2H_5O)_2P(O)HNCH_2CH_2OH$ | Syrup | 1.4696 | 13 | 96.5 |
| $(C_2H_5O)_2P(O)N(OCCH_3)_2$ | ----do---- | 1.4396 | 14 | 97 |
| $(C_2H_5O)_2P(O)N(C_6H_{11})_2$ | M.P.=140° C. ($C_6H_{12}$) | | 1 | 99 |
| $(C_2H_5O)_2P(S)N(CH_2CH_2)_2O$ | B.P._2=105° C. | 1.4917 | 7 | 76 |
| $(C_2H_5O)_2P(S)HNC_4H_9$ | B.P._7=128° C. | 1.4738 | 8 | 88 |
| $(C_2H_5O)_2P(S)HNCH_2CH_2OH$ | B.P._3=155° C. | 1.4935 | 11 | 91 |
| $(C_2H_5O)_2P(S)HNC_6H_{11}$ | B.P._2=146° C. | 1.4962 | 10 | 99.1 |
| $(C_3H_7O)_2P(O)HNOCCH_3$ | B.P._2=106° C. | 1.4199 | 16 | 72 |
| $(C_3H_7O)_2P(O)N(CH_2COOCH_3)_2$ | B.P._1=162° C. | 1.4419 | 17 | 81 |
| $(C_3H_7O)_2P(O)HNC_6H_{11}$ | M.P.=53° C. (Dioxan) | | 5, 6 | 98.8 |
| $(C_3H_7O)_2P(O)N(C_4H_9)CH_2CH_2OH$ | B.P._2=150-160° C. | 1.4353 | 18 | 96 |
| $(C_3H_7O)_2P(O)HNCH_2CH_2CH_2N(CH_3)_2$ | B.P._2=136° C. | 1.4442 | 19 | 43.3 |
| $(iso-C_3H_7O)_2P(O)HNC_6H_4(CH_3)_2$ | M.P.=84-85° C. ($C_2H_5OH$) | | 20 | 84 |
| $(C_4H_9O)_2P(O)HNC_4H_9$ | B.P._1=145° C. | 1.4382 | 21 | 85 |
| $(C_4H_9O)_2P(O)N(C_4H_9)_2$ | B.P._1=122° C. | 1.4406 | 22 | 94 |
| $(C_4H_9O)_2P(O)N(iso-C_4H_9)_2$ | B.P._1=111° C. | 1.4384 | 23 | 97.8 |
| $(C_4H_9O)_2P(O)N(CH_2CH_2)_2O$ | B.P._2=143° C. | 1.4522 | 24 | 83 |
| $(C_4H_9O)_2P(O)N(C_4H_9)CH_2CH_2OH$ | B.P._2.5=143° C. | 1.4340 | 25 | 92.4 |
| $(iso-C_4H_9O)_2P(O)N(C_2H_5)_2$ | B.P._1=104° C. | 1.4243 | 26 | 81 |
| $(iso-C_4H_9O)_2P(O)N(C_3H_7)_2$ | B.P._1.5=112° C. | 1.4342 | 27 | 77 |
| $(iso-C_4H_9O)_2P(O)N(C_4H_9)_2$ | B.P._2=139-140° C. | 1.4382 | 28 | 85 |
| $(iso-C_4H_9O)_2P(O)N(iso-C_4H_9)_2$ | B.P._3=127° C. | 1.4381 | 29 | 88 |
| $(C_2H_5O)_2P(O)N(CH_2COOCH_3)_2$ | M.P._1=144-146° C. | 1.4422 | 15 | 70 |

In the table the abbreviation "M.P." stands for melting point and the abbreviation "B.P." stands for boiling point.

The following examples are given to further illustrate distilling off the alcohol there is obtained from the washing liquid a further amount of phosphoric acid-diethylesterethylamide. The total yield is 29.5 g. which is equivalent to a yield of 81.5%.

EXAMPLE 4

*Production of phosphoric acid-dipropylester-anilide*

$(n-C_3H_7O)_2P(O)HNC_6H_5$

A glass beaker is placed in ice water and filled with 130 cc. of 20% aqueous sodium carbonate solution and 18.5 g. of aniline. There is then added dropwise under stirring 34.5 g. of monochlorophosphoric acid-di-n-propylester. A white precipitate is formed. This is filtered off and washed with water until the wash water reacts neutral. The melting point of the compound after recrystallization from petroleum ether is 55° C. The yield is 42.5 g. which is equal to 83.3% of the theoretical.

This compound has many uses as intermediate or end products for many purposes, for example for pharmaceutical preparations, treating agents for textiles, additives for lubricating oils, etc.

EXAMPLE 5

*Production of phosphoric acid-di-n-propylester-cyclohexylamide*

$(C_3H_7O)_2P(O)NHC_6H_{11}$ 40.1 g. of monochlorophosphoric acid-dipropylester is added dropwise to 19.8 g. of cyclohexylamide and 12 g. of sodium hydroxide in 100 cc. of water while stirring and under cooling with ice water. After completion of the dropwise addition the mixture is stirred for an additional 20 minutes. The crystalline mass which is formed is separated by suction filtration and then washed with water. There is thus obtained 53 g. of the above compound which corresponds to a yield of 98.8% of the theoretical. This compound has a melting point of 53° C. (dioxane).

EXAMPLE 6

*Production of phosphoric acid-di-n-propylester-cyclohexylamide*

$(C_3H_7O)_2P(O)NHC_6H_{11}$ 19.8 g. of cyclohexylamine is stirred with 100 cc. of a 5% ammonia solution and 40.1 g. of monochlorophosphoric acid-di-n-propylester are slowly added dropwise. After completion of the dropwise addition the mixture is stirred for an additional 30 minutes and there is thus obtained two layers from which the upper, oily layer is separated. After drying the oil starts to crystallize. There is thus obtained 53 g. of the above compound, corresponding to a yield of 98.8% of the theoretical. This compound after recrystallization from dioxane and petroleum ether has a melting point of 52° C.

EXAMPLE 7

*Production of thiophosphoric acid-diethylester-morpholide*

$(C_2H_5O)_2P(S)N(CH_2CH_2)_2O$

A beaker glass is filled with 17.4 g. of morpholine and 130 cc. of a 20% aqueous sodium carbonate solution. There is then added dropwise under stirring 37.7 g. of thiophosphoric acid-diethylester-chloride. After completion of the dropwise addition the stirring is continued for an additional 15 minutes and then water is added until the separated salt has dissolved. This results in the formation of two layers of which the lower, oily layer is separated. After drying there is obtained 38 g. of thiophosphoric acid-diethylester-morpholide, corresponding to 79.5% of the theoretical. The B.P.$_2$ is equal to 105° C., and $n_D^{20} = 1.4917$.

EXAMPLE 8

*Production of thiophosphoric acid-O,O-diethylester-monobutylamide*

$(C_2H_5O)_2P(S)NHC_4H_9$ 37.7 g. of thiophosphoric acid-diethylester-chloride are slowly added to 14.6 g. of n-butylamine and 130 cc. of 20% aqueous sodium carbonate solution while stirring. After the end of the addition the stirring is continued for an additional 30 minutes and then approximately 600 cc. of water is added. The lower layer is separated by means of a separatory funnel and dried over $Na_2SO_4$. The yield is 32 g. which corresponds to 71% of the theoretical. The B.P.$_7 = 128°$ C.; $n_D^{20} = 1.4738$.

EXAMPLE 9

*Production of thiophosphric acid-diethylester-anilide*

$(C_2H_5O)_2P(S)NHC_6H_5$ 14 g. of aniline and 6 g. of sodium hydroxide in 20 cc. of water are stirred and then there is slowly added thereto, dropwise, 28.3 g. of monochloro-thiophosphoric acid-diethylester. After an additional 20 minutes of stirring 100 cc. of water is added and the oil is separated. After drying over sodium sulfate there is obtained 28.7 g. of the desired compound which corresponds to a yield of 78% of the theoretical. B.P.$_2 = 140-150°$ C.; $n_D^{20} = 1.5482$.

EXAMPLE 10

*Production of thiophosphoric acid-diethylester-cyclohexylamide*

$(C_2H_5O)_2P(S)NHC_6H_{11}$ 27 g. of monochlorothiophosphoric acid-diethylester is added dropwise to a stirred mixture of 14.2 g. of cyclohexylamine and 30 g. of sodium carbonate crystals in 100 cc. of water. The stirring is continued for an additional 15 minutes and then the oily layer is separated in a separatory funnel. The oily layer is then dried over sodium sulfate and distilled under vacuum. The B.P.$_2 = 146°$ C.; the yield $= 33.5$ g. corresponding to 99.1% of the theoretical; and $n_D^{20} = 1.4962$. The calculated amount of phosphorus $= 13.1\%$ and the amount which is found upon analysis is also equal to 13.1%.

EXAMPLE 11

*Production of thiophosphoric acid-diethylester-2-oxyethylamide*

$(C_2H_5O)_2P(S)HNCH_2CH_2OH$ 28.3 g. of monochlorothiophosphoric acid-diethylester is added dropwise during a time period of 20 minutes to a vibrating mixture of 9.15 g. of ethanolamine, 42.9 g. of sodium carbonate crystals and 30 cc. of water. The mixture is vibrated an additional 15 minutes, 100 cc. of water is added thereto and the oily layer is separated. After drying over sodium sulfate there is obtained 29 g. which corresponds to 91% of the theoretical of the desired compound. The B.P.$_3 = 155°$ C.; $n_D^{20} = 1.4935$; the calculated amount of phosphorus $= 15.27\%$. The amount which is found upon analysis is 15.0% in one test and 15.3% in another test. The calculated amount of sulfur is 15.77%. The amount which is found upon analysis is 15.7% in one test and 15.8% in another test.

EXAMPLE 12

*Production of thiophosphoric acid-diethylester-di-(2-oxyethyl)amide*

$(C_2H_5O)_2P(S)N(CH_2CH_2OH)_2$ 37.7 g. of monochlorothiophosphoric acid-diethylester is added dropwise under stirring during a time period of 30 minutes to a mixture of 21 g. of diethanolamine and 8 g. of sodium hydroxide in 32 cc. of water. The mixture is stirred an additional 20 minutes and then 100 cc. of water is added thereto. The oily layer is separated and dried over sodium sulfate. After the addition of a filter aid the material is filtered and there is thus obtained 40 g. of the desired compound as a yellow oil. $n_D^{20} = 1.4940$.

EXAMPLE 13

*Production of phosphoric acid-diethylester-2-oxyethyl-amide*

$$(C_2H_5O)_2P(O)NHCH_2CH_2OH$$

97.2 g. of $Na_2CO_3.10H_2O$ and 12.2 g. of ethanolamine are dissolved in 100 cc. of water. 34.5 g. of chlorophosphoric acid-diethylester is then added dropwise under stirring. Upon completion of the dropwise addition the stirring is continued for an additional 20 minutes. The reaction mixture is concentrated under vacuum. The residue of the vacuum concentration is extracted with absolute ethanol. After evaporation of the ethanol there is obtained 38 g. of a practically colorless oil. $n_D^{20}=1.4696$.

EXAMPLE 14

*Production of phosphoric acid-diethylester-diacetyl-amide*

$$(C_2H_5O)_2P(O)N(OCCH_3)_2$$

17.3 g. of chlorophosphoric acid-diethylester is added dropwise under vigorous stirring through 45 g. of $Na_2CO_3.10H_2O$ in 100 cc. of water which contains 10.1 g. of diacetylamide. Upon completion of the dropwise addition the reaction mixture is evaporated to dryness. This residue is extracted with absolute ethanol. After evaporation of the ethanol there remains 23 g. = 96.9% of the theoretical of a yellow oil. $n_D^{20}=1.4396$.

EXAMPLE 15

*Production of phosphoric acid-diethylester-(dicarbomethoxymethyl)-amide*

$$(C_2H_5O)_2P(O)N(CH_2COOCH_3)_2$$

36.2 g. of chlorophosphoric acid-diethylester is added slowly, dropwise, under vigorous stirring to 100 cc. of 20% aqueous sodium carbonate solution containing 32.2 g. of imino-diacetic acid-dimethyl ester. The reaction mixture is diluted with about 100 cc. of water and the oily layer is separated by means of a separatory funnel. After drying over sodium sulfate this oily layer is distilled. There is thus obtained the desired compound in the yield of 70% of the theoretical. The boiling point $(B.P._1)=144-146°$ C.; $n_D^{20}=1.4422$.

EXAMPLE 16

*Production of phosphoric acid-di-n-propylester-acetyl-amide*

$$(n—C_3H_7O)_2P(O)HNOCCH_3$$

40.1 g. of chlorophosphoric acid-di-propylester is added dropwise under stirring to a stirred solution of 11.8 g. of acetamide in 100 cc. of 20% sodium carbonate aqueous solution. The mixture is stirred an additional 20 minutes. After dilution with about 100 cc. of water an oil is separated from the reaction mixture, and after drying over waterfree sodium sulfate is distilled under vacuum. The desired compound is thus obtained in the yield of 72% of the theoretical. The boiling point $(B.P._2)=120-140°$ C.; $n_D^{20}=1.4199$.

EXAMPLE 17

*Production of phosphoric acid-di-n-propylester-di-(carbomethoxymethyl)-amide*

$$(n—C_3H_7O)_2P(O)N(CH_2COOCH_3)_2$$

130 cc. of 20% aqueous sodium carbonate solution and 32.2 g. of imino-diacetic acid-dimethylester are cooled with ice water. 40.1 g. of chlorophosphoric acid-dipropylester are added dropwise under vigorous stirring. After the addition of 100 cc. of water the oil is separated and dried over sodium sulfate. Upon subsequent distillation there is obtained 81% of the theoretical as the yield of the desired compound. The boiling point $(B.P._1)=162°$ C.; $n_D^{20}=1.4419$.

EXAMPLE 18

*Production of phosophoric acid-di-n-propylester-(n-butyl-ethanol)-amide*

$$(n—C_3H_7O)_2P(O)N(C_4H_9—n)CH_2CH_2OH$$

40.1 g. of chlorophosphoric acid-dipropylester are added dropwise under stirring to 31.4 g. of $$Na_2CO_3.10H_2O$$

and 23.8 g. of butylethanolamine in 100 cc. of water. The reaction mixture is diluted with 150 cc. of water and an oily layer is separated. Upon drying over waterfree sodium sulfate there is obtained 94 g. of the desired compound which is equivalent to a yield of 96% of the theoretical. The boiling point $(B.P._2)=150-160°$ C.; $n_D^{20}=1.4353$.

EXAMPLE 19

*Production of phosphoric acid-di-n-propylester-dimethylamino-propyl-amide*

$$(n—C_3H_7O)_2P(O)NHCH_2CH_2CH_2N(CH_3)_2$$

40.1 g. of chlorophosphoric acid-dipropylester is added dropwise under vigorous stirring to a mixture of 80 cc. of 20% aqueous sodium carbonate solution and 20.4 g. of dimethyl-aminopropylamine. The reaction mixture is stirred an additional 15 minutes and the water is then distilled from the reaction mixture at a water ejector pump, the residue is filtered and the filtrate is distilled under vacuum. There is thus obtained the desired compound in a yield of 43.3% of the theoretical. Boiling point $(B.P._2)=136°$ C.; $n_D^{20}=1.4442$.

EXAMPLE 20

*Production of phosphoric acid-di-iso-propylester-o-toluidide*

$$(i—C_3H_7O)_2P(O)HNC_6H_4(CH_3)_2$$

30.1 g. of chlorophosphoric acid-di-iso-propylester are added slowly under stirring and cooling with ice water to 100 cc. of 25% aqueous sodium carbonate solution containing 16.1 g. of o-toluidine. The stirring is continued for an additional 30 minutes. Two layers are formed of which the oily layer is separated. Upon washing of the oily layer with water the desired compound crystallizes. The yield of the desired compound is 84% of the theoretical. The melting point after recrystallization from ethanol is equal to 85° C.

EXAMPLE 21

*Production of phosphoric acid-di-n-butylester-n-butylamide*

$$(n—C_4H_9O)_2P(O)NHC_4H_9—n$$

45.7 g. of chlorophosphoric acid-di-butylester are added under stirring to 150 cc. of 20% aqueous sodium carbonate solution and 14.6 g. of butylamine. After dilution with about 200 cc. of water the oily layer is separated and dried over sodium sulfate. The yield is equal to 85% of the theoretical. The boiling point $(B.P._1)=145°$ C.; $n_D^{20}=1.4382$.

EXAMPLE 22

*Production of phosphoric acid-di-n-butylester-di-n-butylamide*

$$(n—C_4H_9O)P(O)N(C_4H_9—n)_2$$

45.7 g. of chlorophosphoric acid-di-butylester are added under vigorous stirring to 26 g. of dibutylamine in 150 cc. of 20% aqueous sodium carbonate solution. After dilution with 150 cc. of water the oily layer is separated and dried over waterfree sodium sulfate. The yield=94% of the theoretical. The boiling point $(B.P._1)=122°$ C.; $n_D^{20}=1.4406$.

EXAMPLE 23

*Production of phosphoric acid-di-n-butylester-di-iso-butylamide*

$$(n-C_4H_9O)_2P(O)N(CH_4H_9-i)_2$$

65 g. of $Na_2CO_3.10H_2O$ and 26 g. of di-iso-butylamine are dissolved in 150 cc. of water. 45.7 g. of chlorophosphoric acid-di-butylester are added slowly thereto under vigorous stirring. The reaction mixture is diluted with 150 cc. of water and the oily layer is separated in a separatory funnel. After drying over sodium sulfate there is obtained 63 g. of the desired compound which corresponds to a yield of 98% of the theoretical. The boiling point (B.P.$_{.1}$)=111° C.; $n_D^{20}$=1.4384.

EXAMPLE 24

*Production of phosphoric acid-di-n-butylester-morpholide*

$$(n-C_4H_9O)_2P(O)N(C_2H_4)_2O$$

45.7 g. of chlorophosphoric acid-di-butylester are added dropwise under stirring to an emulsion of 17.4 g. of morpholine in 130 cc. of 20% aqueous sodium carbonate solution. The reaction mixture is diluted with 150 cc. of water and the oily layer is separated. After drying over sodium sulfate the desired compound is obtained in an amount of 46 g. which is equal to 82.4% of the theoretical. Boiling point (B.P.$_{.2}$)=143° C.; $n_D^{20}$=1.4522.

EXAMPLE 25

*Production of phosphoric acid-di-n-butylester-(n-butyl-ethanol)-amide*

$$(n-C_4H_9O)_2P(O)N(C_4H_9-n)CH_2CH_2OH$$

45.6 g. of chlorophosphoric acid-di-butylester are added dropwise under stirring to 23.8 g. of 98% butyl-ethanolamine and 32 g. of $Na_2CO_3.10H_2O$ in 100 cc. of water. The stirring is continued for an additional 20 minutes and then 250 cc. of water are added. The oily layer is separated and dried over sodium sulfate. The yield is 57 g.=92.4% of the theoretical. Boiling point (B.P.$_{.2.5}$)=143° C.; $n_D^{20}$=1.4340.

EXAMPLE 26

*Production of phosphoric acid-di-iso-butylester-diethylamide*

$$(i-C_4H_9O)_2P(O)N(C_2H_5)_2$$

45.7 g. of chlorophosphoric acid-di-isobutylester are added dropwise under stirring and cooling with ice water to 125 cc. of an aqueous 20% sodium carbonate solution containing 14.6 g. of di-ethylamine. Two layers are formed of which the upper layer is distilled under vacuum. The yield is equal to 43 g. which is equivalent to 81% of the theoretical. Boiling point (B.P.$_{.1}$)=104° C.; $n_D^{20}$=1.4243.

EXAMPLE 27

*Production of phosphoric acid-di-i-butylester-di-n-propylamide*

$$(i-C_4H_9O)_2P(O)N(C_3H_7-n)_2$$

45.7 g. of chlorophosphoric acid-di-isobutylester are added dropwise under vigorous stirring to an ice-cooled mixture of 20.2 g. of dipropylamine and 120 cc. of aqueous 20% sodium carbonate solution. After dilution with about 200 cc. of water the oily layer is separated and dried over sodium sulfate. The yield is 45 g.=76.7% of the theoretical. Boiling point (B.P.$_{.1.5}$)=112° C.; $n_D^{20}$=1.4342.

EXAMPLE 28

*Production of phosphoric acid-di-iso-butylester-di-n-butylamide*

$$(i-C_4H_9O)_2P(O)N(C_4H_9-n)_2$$

45.7 g. of chlorophosphoric acid-di-iso-butylester are added dropwise to an ice-cooled mixture of 25.9 g. of di-butylamine and 120 cc. of 20% aqueous sodium carbonate solution. After dilution with 100 cc. of water the oily layer is separated and dried over sodium sulfate. The yield is 54.5 g.=84.8% of the theoretical. Boiling point (B.P.$_{.2}$)=139–140° C.; $n_D^{20}$=1.4382.

EXAMPLE 29

*Production of phosphoric acid-di-iso-butylester-di-isobutylamide*

$$(i-C_4H_9O)_2P(O)N(C_4H_9-i)_2$$

45.7 g. of chlorophosphoric acid-di-iso-butylester are added dropwise under vigorous stirring to a mixture of di-iso-butylamine and 120 cc. of 20% aqueous sodium carbonate solution which is cooled with ice-water. The liquid separates into two layers of which the upper layer is separated and distilled under vacuum. The yield is 56.5 g. which is equivalent to 87.9% of the theoretical. Boiling point (B.P.$_{.3}$)=127 C.; $n_D^{20}$=1.4381.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The compound $(C_2H_5O)_2P(O)N(OCCH_3)_2$.
2. The compound $(C_3H_7O)_2P(O)HNOCCH_3$.
3. The compound $(C_3H_7O)_2P(O)N(CH_2COOCH_3)_2$.
4. The compound
   $(C_3H_7O)_2P(O)N(C_4H_9)CH_2CH_2OH$
5. The compound
   $(C_4H_9O)_2P(O)N(C_4H_9)CH_2CH_2OH$
6. The compound $(C_2H_5O)_2P(O)N(CH_2COOCH_3)_2$.

References Cited in the file of this patent

UNITED STATES PATENTS

| | | |
|---|---|---|
| 2,146,584 | Lipkin | Feb. 7, 1939 |
| 2,151,380 | Flint | Mar. 21, 1939 |
| 2,418,224 | Georges | Apr. 1, 1947 |
| 2,587,549 | Trementozzi | Feb. 26, 1952 |
| 2,670,369 | Filatoff-Rocq et al. | Feb. 23, 1954 |
| 2,736,726 | Gaetzi et al. | Feb. 28, 1956 |
| 2,752,392 | Saul et al. | June 26, 1956 |
| 2,802,823 | Tolkmith et al. | Aug. 13, 1957 |
| 2,842,527 | Melamed | July 8, 1958 |
| 2,865,912 | Pohleman et al. | Dec. 23, 1958 |

FOREIGN PATENTS

| | | |
|---|---|---|
| 556,145 | Germany | Aug. 3, 1952 |
| F13,220IVb/120 | Germany | Nov. 29, 1956 |

OTHER REFERENCES

Kosolapoff: Organo Phosphorous Compounds, John Wiley & Sons., Inc., New York, 1950, pp. 278–309.

Grechkin: Chemical Abstracts, 51, 1933 (1957).